(12) United States Patent
Guillet et al.

(10) Patent No.: US 11,059,591 B2
(45) Date of Patent: Jul. 13, 2021

(54) FASTENING SYSTEM FOR A SEAT AND ASSOCIATED AIRCRAFT

(71) Applicant: ATTAX, Carrieres sur Seine (FR)

(72) Inventors: Elie Stanislas Guillet, Carrieres sur Seine (FR); Romain Danet, Maisons-Laffitte (FR)

(73) Assignee: ATTAX, Carrieres sur Seine (FR)

( * ) Notice: Subject to any disclaimer, the term of this patent is extended or adjusted under 35 U.S.C. 154(b) by 0 days.

(21) Appl. No.: 16/530,968

(22) Filed: Aug. 2, 2019

(65) Prior Publication Data

US 2020/0039652 A1 Feb. 6, 2020

(30) Foreign Application Priority Data

Aug. 3, 2018 (FR) ...................................... 18 57309

(51) Int. Cl.
*B64D 11/06* (2006.01)

(52) U.S. Cl.
CPC ................................ *B64D 11/0696* (2013.01)

(58) Field of Classification Search
CPC ... B64D 11/0696; B64D 11/06; F16B 41/002; B60N 2/005; B60N 2/07; B60N 2/02
USPC ........ 248/118.1, 118.6, 122 R, 188.9, 503.1; 411/386, 389
See application file for complete search history.

(56) References Cited

U.S. PATENT DOCUMENTS

| | | | |
|---|---|---|---|
| 4,256,424 A | 3/1981 | Knox et al. | |
| 4,796,837 A * | 1/1989 | Dowd ................ | B64D 11/0696 244/122 R |
| 4,932,816 A * | 6/1990 | Ligensa ................. | B64D 9/003 244/118.6 |
| 5,083,726 A * | 1/1992 | Schurr ............... | B64D 11/0696 244/118.6 |
| 5,169,091 A * | 12/1992 | Beroth ................... | B64D 9/003 244/118.1 |
| 5,178,346 A * | 1/1993 | Beroth ................... | B64D 9/003 244/118.1 |

(Continued)

FOREIGN PATENT DOCUMENTS

| | | |
|---|---|---|
| DE | 199 00 267 A1 | 7/2000 |
| DE | 10 2013 108540 A1 | 2/2015 |

(Continued)

OTHER PUBLICATIONS

Search Report received in French Patent Application No. 1857309 dated Apr. 10, 2019.

*Primary Examiner* — Muhammad Ijaz
(74) *Attorney, Agent, or Firm* — Knobbe, Martens, Olson & Bear LLP

(57) ABSTRACT

A system for fastening a seat in a rail includes a base and a retainer including clamping jaws blocking the system in position in the rail by pinching of the rail between the base and the clamping jaws. The retainer is movable relative to the base between a separated first position and a close second position using a maneuvering and clamping system that is able to be actuated between an unlocked position and a locked position. The maneuvering and clamping system includes a tightening screw for tightening the retainer on the base and a part carried by the retainer and movable between a retracted position and an active position in which the part is inserted between a head of the tightening screw and the retainer.

12 Claims, 3 Drawing Sheets

(56) References Cited

U.S. PATENT DOCUMENTS

| | | | | |
|---|---|---|---|---|
| 5,871,318 | A * | 2/1999 | Dixon | B60N 2/01558 |
| | | | | 410/105 |
| 7,641,426 | B2 * | 1/2010 | Stubbe | B64D 11/0696 |
| | | | | 410/105 |
| 7,857,561 | B2 * | 12/2010 | Mejuhas | B64D 11/0696 |
| | | | | 410/105 |
| 2004/0240962 | A1 * | 12/2004 | Teng | F16B 41/002 |
| | | | | 411/353 |
| 2007/0065248 | A1 * | 3/2007 | Legeay | B60N 2/01575 |
| | | | | 410/105 |
| 2007/0138821 | A1 * | 6/2007 | Mejuhas | B64D 11/0696 |
| | | | | 296/65.01 |
| 2007/0164187 | A1 * | 7/2007 | Frey | B60P 7/0815 |
| | | | | 248/501 |
| 2008/0191115 | A1 * | 8/2008 | Stubbe | B64D 11/0696 |
| | | | | 248/503.1 |
| 2009/0026827 | A1 * | 1/2009 | Bishop | B60P 7/0815 |
| | | | | 297/463.1 |
| 2011/0253874 | A1 * | 10/2011 | Marechal | B64D 11/0696 |
| | | | | 248/503.1 |
| 2015/0284096 | A1 * | 10/2015 | De Morais | B64C 1/20 |
| | | | | 403/327 |
| 2016/0039526 | A1 * | 2/2016 | Mejuhas | B64D 11/0696 |
| | | | | 248/188.9 |
| 2016/0194085 | A1 * | 7/2016 | Stubbe | B60N 2/01558 |
| | | | | 248/503.1 |

FOREIGN PATENT DOCUMENTS

| | | |
|---|---|---|
| EP | 3 050 799 A1 | 8/2016 |
| FR | 2 953 488 B1 | 12/2009 |

* cited by examiner

FASTENING SYSTEM FOR A SEAT AND ASSOCIATED AIRCRAFT

INCORPORATION BY REFERENCE TO ANY PRIORITY APPLICATIONS

Any and all applications for which a foreign or domestic priority claim is identified in the Application Data Sheet as filed with the present application are hereby incorporated by reference.

BACKGROUND OF THE INVENTION

Field of the Invention

The present invention relates to a fastening system for a seat, in particular an aircraft seat, and an aircraft comprising such a system.

Description of the Related Art

Seat fastening systems for this type of application are already known in the state of the art that are suitable for fastening a seat in a rail of the rest of the aircraft.

As a general rule, such a fastening system in particular includes a base provided with means in the form of a clamping jaw and blocking the system in position in the rail, by pinching the latter between the base and these clamping jaw-forming means.

The base and the clamping jaw means are then movable relative to one another, between a first separated position for assembling/disassembling the system in the rail, and a second close position for blocking the system, by clamping around the rail, via maneuvering means able to be actuated by an assembly/disassembly operator.

In the simplest versions of these fastening systems, like for example in that described in document FR 2,953,488 in the applicant's name, these maneuvering means actionable by the assembly/disassembly operator to provide the blocking of the system in position, are formed by a tightening screw and are therefore movable between an unlocked position and a locked position of the system, by screwing for example using any tool manipulated by the assembly/disassembly operator.

However, all of these known systems have a certain number of drawbacks, in particular in terms of the ease and speed of this assembly/disassembly.

In particular, the tightening screw should be screwed as long as the clamping jaw means are brought closer to the base.

SUMMARY OF THE INVENTION

The invention therefore aims to resolve these problems.

To that end, the invention relates to a system for fastening a seat, in particular an aircraft seat, in a rail of the rest of this aircraft, of the type including a base and a retainer comprising clamping jaw-forming means blocking the system in position in the rail by pinching of the rail between the base and these clamping jaw-forming means, the retainer being movable relative to the base between a first separated position for assembly/disassembly of the system in the rail and a second close position for blocking the system by clamping around the rail using maneuvering and clamping means able to be actuated between an unlocked position and a locked position of the system, wherein the maneuvering and clamping means able to be actuated comprise a tightening screw for tightening the retainer on the base and a part carried by the retainer, the part being movable between a retracted position and an active position in which the part is inserted between a head of the tightening screw and the retainer.

According to other features of the device according to the invention, considered alone or in combination:
- the part is a retractable spacer,
- the part is translatable along a longitudinal direction relative to the retainer, the part being located directly below the head of the tightening screw in an elevation direction in the active position,
- the retainer defines at least one guide groove in the longitudinal direction, the part having a sliding element able to slide in the guide groove in the longitudinal direction,
- the actuatable maneuvering and clamping means comprise an automated system provided to move the part into the active position in case of movement of the retainer into the second close position,
- the automated system comprises a resilient urging member inserted between the part and the retainer, the resilient urging member applying a force on the part driving the part into its active position,
- the resilient urging member is a torsion spring having a first end fastened to the part and a second end fastened to the retainer,
- in the first separated position of the retainer, the part is in contact with the periphery of the head of the tightening screw, said contact opposing the passage of the part to its active position,
- the part has a general U shape, the general U shape having branch ends in contact with the head of the tightening screw in the retracted position, the branches being able to engage below the head of the tightening screw in the active position,
- hard spot crossing means are provided between the base and the retainer to keep the retainer in the first separated position for assembly/disassembly of the system; and
- the retainer comprises at least one active position indicator of the part, the active position indicator being covered by the part in its retracted position.

According to another aspect, the invention also relates to an aircraft, comprising a seat and a rail, the seat being fastened to the rail owing to at least one fastening system as described above.

BRIEF DESCRIPTION OF THE DRAWINGS

The invention will be better understood upon reading the following description, provided solely as an example, and done in reference to the appended drawings, in which.

DETAILED DESCRIPTION OF THE PREFERRED EMBODIMENT

Figure 1:
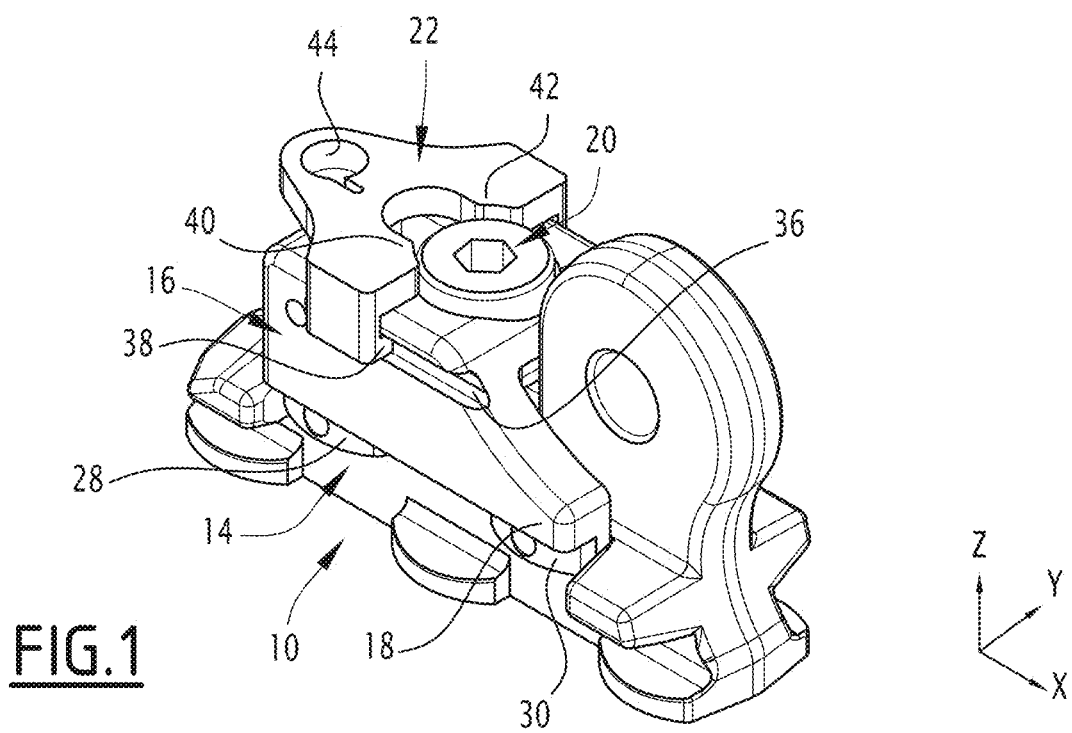
FIG. 1 is a perspective view of a fastening system according to a first embodiment in a first separated position.
Figure 2:
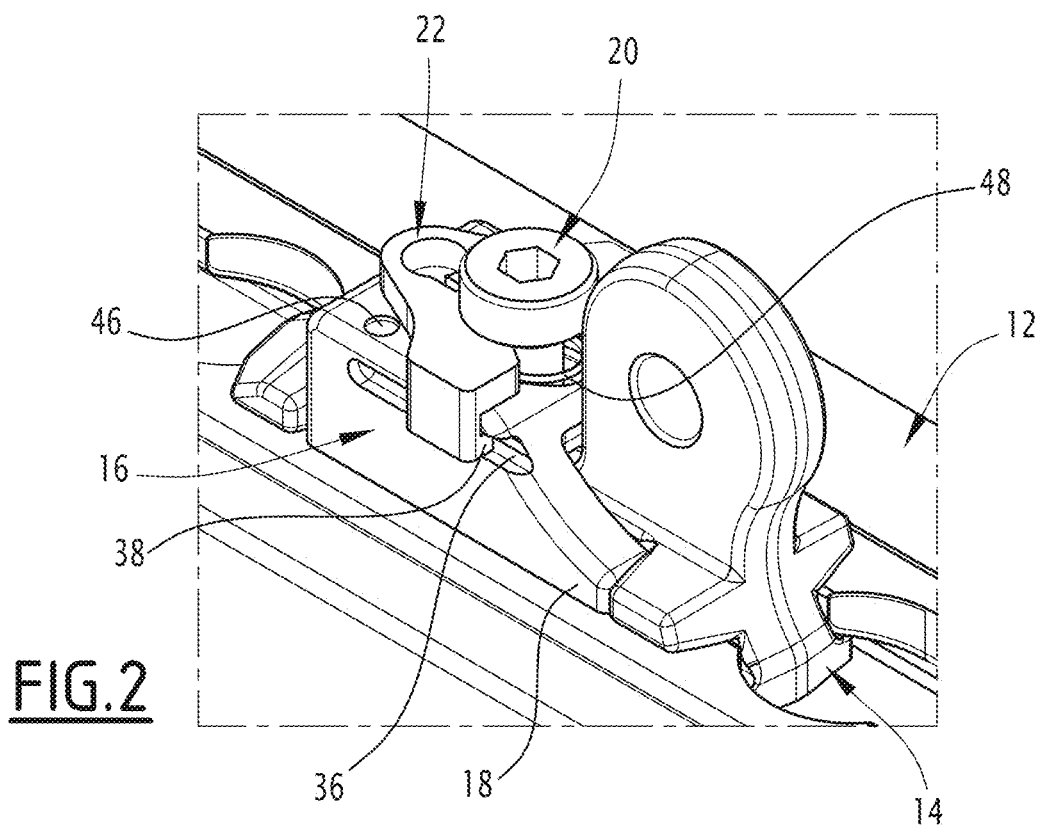
FIGS. 2 and 3 are perspective in sectional views of the fastening system of FIG. 1 in a second close position.
Figure 3:
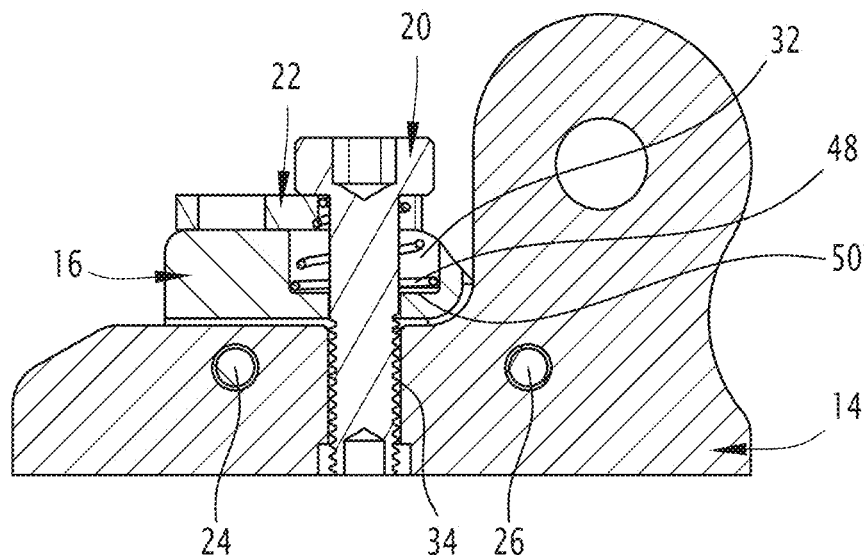

A system for fastening a seat, in particular an aircraft seat, in a rail of the rest of this aircraft according to a second embodiment of the invention is shown in FIGS. 1 to 3.

In these figures, the fastening system is designated by general reference 10 and the rail of the rest of the aircraft is designated by general reference 12.

This system includes a base designated by general reference 14, and a retainer designated by general reference 16.

The retainer 16 comprises means in the form of a clamping jaw and blocking the system in position in the rail, by pinching the latter between the base and these clamping jaw-forming means.

The clamping jaw means are designated by general reference 18 in these figures.

As illustrated in these figures, the retainer 16 is movable relative to the base 14, between a first separated position for assembly/disassembly of the system in the rail, as illustrated for example in FIG. 1, and a second close position for blocking the system by clamping around the rail, as illustrated in FIGS. 2 and 3.

This movement of the retainer 16 is obtained via maneuvering and clamping means able to be actuated, for example by an operator, for assembling/disassembling the system in the rail, in order to move the system between an unlocked position and a locked position in the rail.

As will be described in more detail hereinafter, these maneuvering means for example comprise a tightening screw for tightening the retainer on the base designated by general reference 20 and a part carried by the retainer designated by reference 22.

As is also illustrated in these figures, hard spot crossing means are provided between the base 14 and the retainer 16 to keep the retainer in the first separated position for assembly/disassembly of the system.

This makes it possible to facilitate the assembly and disassembly of the system.

Indeed, it is simpler for the operator to assemble and disassemble the system if these two parts are separated.

These hard spot crossing means for example comprise at least one ball spring plunger, placed in a corresponding hole of the base.

This hole for example passes all the way through the base.

In the exemplary embodiment illustrated in these figures, two ball spring plungers are used and designated by general references 24 and 26.

Indeed, these ball spring plungers for example have a threaded outer body, which is then suitable for being engaged in a tapped hole of the base, conventionally.

Thus, these hard spot crossing means make it possible to keep the retainer in its position separated from the base, during operations for assembly in position and disassembly of this system in/from the rail, by the operator.

Once in the assembly position, the assembly operator can then press on this retainer to move it toward its second position close to the base, blocking position of the fastening system by clamping around the rail.

It will be noted to that end that the retainer can also for example include lateral protruding parts 28 and 30, provided to engage in corresponding recesses of the rail, facilitating the maneuvering and the movements of these clamping jaw means and allowing indexing of the system along the main direction of the rail, by the operator.

One can thus see that the operator can press on the retainer, which allows the balls of the ball spring plungers to retract, in order to free the passage and therefore allow the movement of this retainer toward its second position.

During the disassembly, the operator can pull on the retainer to move it from its close second position toward its separated first position, here again by crossing the hard spot defined by the balls of the plungers 24 and 26.

As previously indicated, the actuatable maneuvering and clamping means for assembly/disassembly for example comprise a screw 20 and a part 22 carried by the retainer 16.

The screw is engaged in a hole 32 of the retainer and in an at least partially tapped hole 34 of the base.

The screw has a thread complementary to the tapping of the hole 34 of the base, so as to be able to be screwed/unscrewed in said hole.

The part 22 is movable between a retracted position visible in FIG. 1 and an active position visible in FIG. 2.

The part is, for example, a retractable spacer.

The part here is translatable along a longitudinal direction X relative to the retainer 16.

In the active position, the part is inserted between a head of the screw 20 and the retainer 16, more specifically when the retainer 16 is in the close second position. The part here is located directly below the head of the screw in an elevation direction Z in the active position.

When the retainer 16 is in the separated first position, the part 22 is for example located substantially at the same level as the head of the tightening screw 20 along the elevation direction Z, such that the part 22 is in the retracted position and cannot be moved into the active position.

The part 22 comprises a general U shape, the general U shape having branches designated by references 40, 42 and the ends of which are in contact with the head of the screw 20 in the retracted position, the branches being able to engage below the head of the screw 20 in the active position.

The general U shape moves over an upper surface of the retainer 16, i.e., in contact with or near the upper surface of the retainer.

The part 22 is secured to the retainer 16.

The part 22 is stationary relative to the retainer along the elevation direction Z, and advantageously, along a transverse direction Y perpendicular to the longitudinal X and elevation Z directions.

The retainer 16 further defines at least one guide groove of the movable part 22, the groove extending along the longitudinal direction X. More specifically here, the retainer 16 defines two guide grooves, a representative one of which is designated by reference 36 in FIGS. 1 and 2.

The two guide grooves are each defined on a respective outer side of the retainer, the two respective sides being opposite along the transverse direction Y.

The part 22 has a sliding element able to slide in each of the guide grooves along the longitudinal direction X. Each sliding element here is a hook, a representative one of which is designated by reference 38.

The part further defines an orifice, for example a through orifice, designated by general reference 44. The orifice is accessible in the retracted position and in the active position of the part. This for example makes it possible to facilitate the movement of the part by inserting a tool or a finger into said orifice to guide the movement.

The retainer 16 further comprises at least one active position indicator of the part 22, designated by general reference 46, here on the upper surface of said retainer.

The general indicator is for example a color indicator.

The indicator 46 is covered by the part 22 in its retracted position, as shown in FIG. 1, and visible when the part 22 is in its active position as shown in FIG. 2.

This for example makes it possible to apprehend the active or inactive position of the part 22.

A resilient urging member, such as a helical spring designated by general reference 48, is inserted between the retainer and the head of the screw 20.

This spring makes it possible to urge the retainer so as to drive it toward its close second position.

In fact and as is illustrated, the retainer includes, associated with the passage hole of the screw, a spot facing 50 for receiving this spring 48, as illustrated in FIG. 3.

Thus, once the system has been placed in the rail while the retainer is in the separated first position, and once the latter is positioned correctly in this rail, the operator presses on the retainer to move it into the close second position.

The operator can then move the part into the active position and screw the screw into the at least partially tapped hole of the base.

This thus allows the tightening of the clamping jaw means on the base, by pinching the rail between the base and the clamping jaw means.

The part makes it possible to react to certain distance along the elevation direction Z, such that it is not necessary to screw the tightening screw as long as the clamping jaw means are brought closer to the base.

For example, the screw is tightened when it is screwed by a rotation angle of less than 270°.

Figure 4:
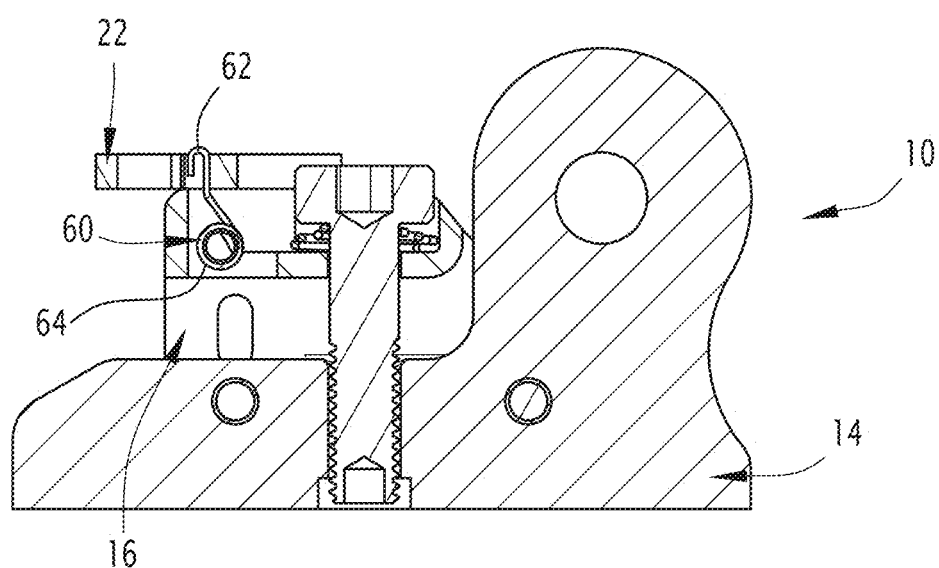
FIG. 4 is a sectional view of a fastening system according to a second embodiment in a first separated position.

A second embodiment is shown in FIG. 4.

The elements identical or similar to the first embodiment are not described again here and are identified with the same references in FIG. 4.

The fastening system 10 according to the second embodiment differs from the first embodiment in that the actuatable maneuvering and clamping means further comprise an automated system provided to move the part 22 into the active position in case of movement of the retainer 16 into the second close position.

The automated system comprises a resilient urging member inserted between the part 22 and the retainer 16, such as a torsion spring, designated by reference 60.

In the illustrated example, the torsion spring has a first end 62 fastened to the part 22 and a second end 64 fastened to the retainer 16.

The torsion spring 60 applies a force on the part 22 driving it into its active position.

In the first separated position of the retainer, the part is in contact with the periphery of the head of the tightening screw, said contact opposing the torsion spring and thus the passage of the part to its active position.

When the retainer 16 has entered the close second position, the part 22 being secured to the retainer 16 in the elevation direction Z, it goes to a level lower than the head of the screw in the elevation direction Z, such that the torsion spring drives it to the active position automatically.

Thus, when the operator moves the retainer 16 from the separated first position to the close second position, the part 22 is automatically driven to the active position by the automated system. The operator then needs only tighten the tightening screw 20 over the remaining travel.

Figure 5:
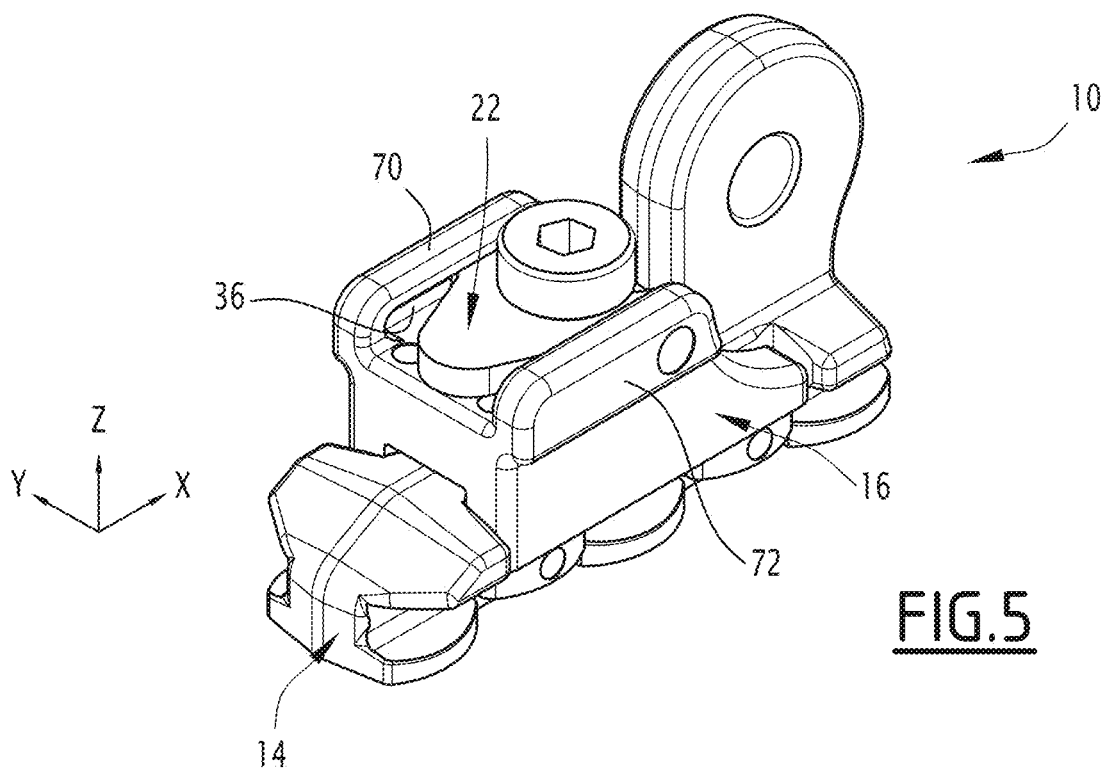
FIG. 5 is a perspective view of a fastening system according to a third embodiment in a second close position.

A third embodiment of a fastening system 10 according to the invention is shown in FIG. 5.

The elements identical or similar to the first embodiment are not described again here and are identified with the same references in FIG. 5.

The guide grooves 36 along the longitudinal direction X here are not each defined on a respective outer side of the retainer.

Indeed, the retainer 16 here comprises two vertical protrusions 70, 72 extending along the longitudinal X and elevation Z directions from its upper surface, more particularly from the edges of the upper surface along the transverse direction Y.

The vertical protrusions are opposite along the transverse direction Y.

Each vertical protrusion 70, 72 comprises a shoulder along the transverse direction Y such that the upper surface of the retainer and said protrusion define a U-shaped rail, forming the guide groove 36.

The part 22 does not comprise a hook. Each sliding element here is formed by an edge of the part 22 inserted into the guide groove 36.

The part 22 extends over an entire width of the upper surface along the transverse direction Y, such that the edges of the part 22 along the transverse direction Y are inserted on either side in the guide grooves 36. The part 22 is thus kept carried by the retainer 16 while allowing a translational movement along the longitudinal direction X.

Figure 6:
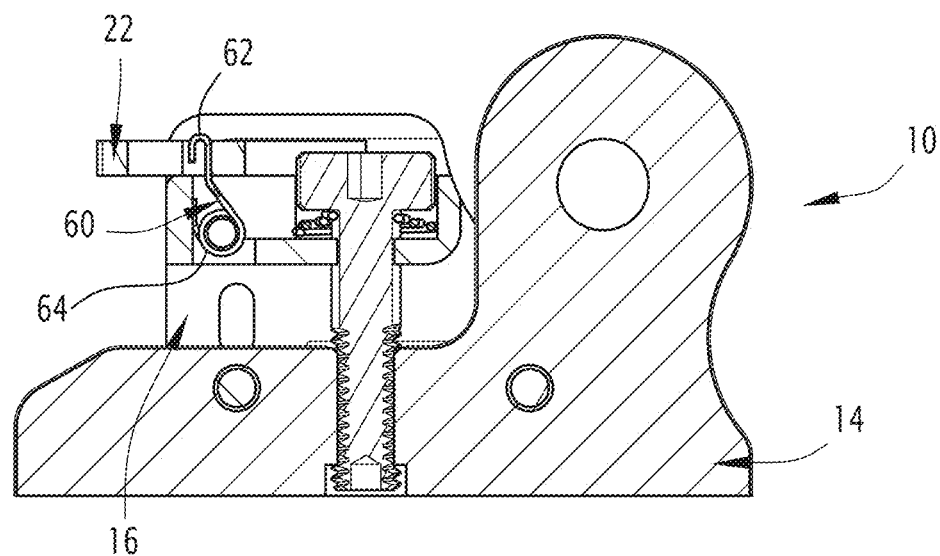
FIG. 6 is a perspective view of a fastening system according to a fourth embodiment in a first separated position.

A fourth embodiment of a fastening system 10 according to the invention is shown in FIG. 6.

The fourth embodiment corresponds to the third embodiment of the invention shown in FIG. 5, in which the automated system of the second embodiment described in light of FIG. 4 is added.

In an embodiment that is not shown, the retainer does not comprise a guide groove and the part does not comprise an element able to slide in said guide groove. The part for example comprises two slots extending along the longitudinal direction and the retainer comprises two pins on its upper surface, each pin being able to move in a slot, so as to allow a translation of the part relative to the retainer. Each pin comprises, at its free end, a wider endpiece or a shoulder so as to keep the part jammed between the upper surface of the retainer and said endpiece or shoulder.

Of course, many other embodiments of this system can be considered.

What is claimed is:

1. A system for fastening a seat in an aircraft in a rail of the aircraft, the system comprising:
   a base having an at least partially tapped hole; and
   a retainer comprising
      clamping jaws blocking the system in position in the rail by pinching of the rail between the base and the clamping jaws,
   the retainer being movable relative to the base between a first separated position for assembly and disassembly of the system in the rail and a second close position for blocking the system by clamping around the rail using a maneuvering and clamping system able to be actuated between an unlocked position and a locked position of the system,
      wherein the maneuvering and clamping system able to be actuated comprises:
         a tightening screw for tightening the retainer on the base, the tightening screw being configured to be screwed and unscrewed in the at least partially tapped hole of the base, wherein the tightening screw has a screw head, and
         a part carried by the retainer, the part being movable with respect to the base between a retracted position and an active position in which the part is inserted between the flail head of the tightening screw and the retainer, and wherein in the active position, a top surface of the part contacts a bottom surface of the head of the tightening screw, and in the retracted position, the top surface of the part is away from the bottom surface of the head of the tightening screw, such that the part in the retracted position allows screwing of the tightening screw in the base.

2. The fastening system according to claim 1, wherein the part is a retractable spacer.

3. The fastening system according to claim 1, wherein the part is translatable along a longitudinal direction relative to the retainer, the part being located directly below the head of the tightening screw in an elevation direction in the active position.

4. The fastening system according to claim 3, wherein the retainer defines at least one guide groove in the longitudinal direction, the part having a sliding element able to slide in the guide groove in the longitudinal direction.

5. The fastening system according to claim 1, wherein the maneuvering and clamping system comprises an automated system provided to move the part into the active position in case of movement of the retainer into the second close position.

6. The fastening system according to claim 5, wherein the automated system comprises a resilient urging member inserted between the part and the retainer, the resilient urging member applying a force on the part driving the part into the active position.

7. The fastening system according to claim 6, wherein the resilient urging member is a torsion spring having a first end fastened to the part and a second end fastened to the retainer.

8. The fastening system according to claim 6, wherein in the first separated position of the retainer, the part is in contact with the periphery of the head of the tightening screw, said contact opposing a passage of the part to the active position.

9. The fastening system according to claim 1, wherein the part has a general U shape, the general U shape having branch ends in contact with the head of the tightening screw in the retracted position, the branches being able to engage below the head of the tightening screw in the active position.

10. The fastening system according to claim 1, wherein a hard spot crossing is provided between the base and the retainer to keep the retainer in the first separated position.

11. The fastening system according to claim 1, wherein the retainer comprises at least one active position indicator of the part, the active position indicator being covered by the part in the retracted position.

12. An aircraft, comprising a seat and a rail, the seat being fastened to the rail owing to at least one fastening system according to claim 1.

* * * * *

UNITED STATES PATENT AND TRADEMARK OFFICE
CERTIFICATE OF CORRECTION

PATENT NO. : 11,059,591 B2
APPLICATION NO. : 16/530968
DATED : July 13, 2021
INVENTOR(S) : Elie Stanislas Guillet It is certified that error appears in the above-identified patent and that said Letters Patent is hereby corrected as shown below:

In the Claims

In Column 6, Line 64, Claim 1, delete "flail head" and insert -- head --.

Signed and Sealed this
Seventh Day of June, 2022

Katherine Kelly Vidal
*Director of the United States Patent and Trademark Office*